3,150,205
PARAFFIN ISOMERIZATION PROCESS
Herbert G. Krane, Gary, Ind., and William W. Sanders, Crete, Ill., assignors to Standard Oil Company, Chicago, Ill., a corporation of Indiana
Filed Sept. 7, 1960, Ser. No. 54,393
14 Claims. (Cl. 260—683.65)

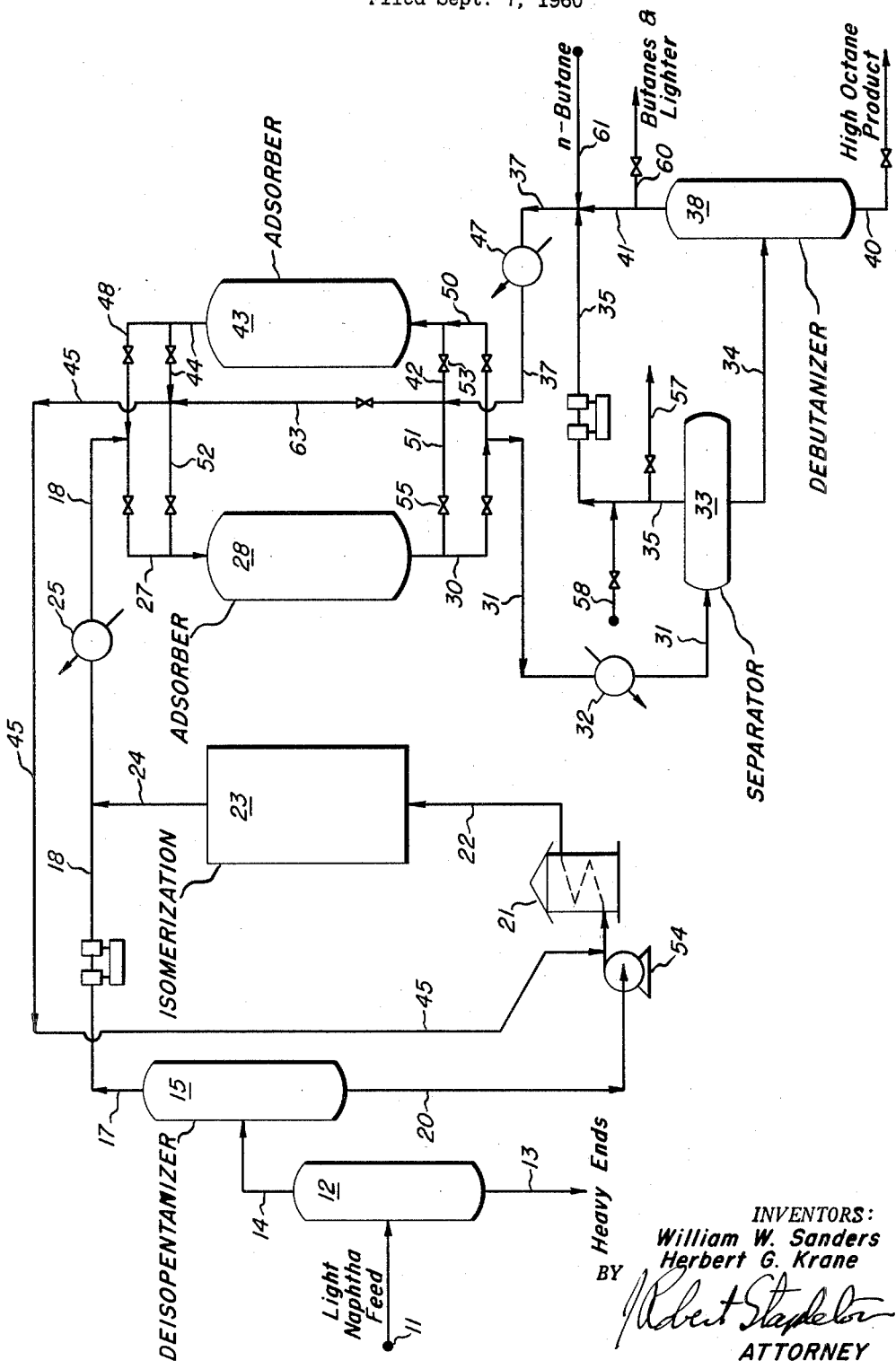

This invention relates to the isomerization of straight-chain hydrocarbons at higher than atmospheric pressures to form branched-chain hydrocarbons and the removal of low-octane components from the resulting isomerate to provide a high-octane isomerized product. More particularly, this invention relates to such removal of low-octane components using a solid adsorbent material which is capable of selectively adsorbing straight-chain hydrocarbons in higher than atomspheric pressure adsorption and desorption steps.

Normal paraffins find limited utility for use in motor fuels. Generally normal paraffins are low-octane components and are considered undesirable in high-octane blending stocks. However, such normal paraffins may be isomerized readily to isoparaffins which have substantially high-octane numbers and are desirable as components of blending stocks.

Isomerization is an equilibrium reaction and in the isomerate or product from isomerization, there will normally appear deleterious amounts of normal paraffins. Such normal paraffins are in deleterious amounts in that they are present in sufficient amounts to detract from the octane number of the isomerate as a gasoline blending stock. Thus, it is desirable to remove normal paraffins from isomerates.

Many processes have been proposed for such removal of normal paraffins from isomerates including distillation, solvent extraction, adsorption, and the like. With recent discoveries regarding use of solid adsorbents, it has been found that certain solid adsorbents will selectively adsorb straight-chain hydrocarbons in preference to non-straight-chain hydrocarbons. Such preferential adsorption is generally effected by using solid adsorbents having small pore sizes obstructing access to the greater adsorptive surfaces of the solid adsorbent. The straight-chain hydrocarbons are of such molecular size to be permitted to pass through the pores and thereby pass into contact with the adsorptive surfaces. Nonstraight-chain hydrocarbons are excluded from the adsorptive surfaces by their molecular size, i.e., they cannot pass through the pores. Such adsorbent materials have been recognized for their ability in separating straight-chain hydrocarbons and their use has been suggested for the separation of straight-chain hydrocarbons and nonstraight-chain hydrocarbons such as occur in an isomerate. Basically, such adsorption or separation processes are carried out by adsorbing the straight-chain hydrocarbons on the adsorbent material and then desorbing the adsorbent material using a pressure decrease, temperature increase or extraneous desorption fluid.

We have now provided a process wherein isomerized hydrocarbons are separated by adsorption of straight-chain hydrocarbons therefrom on a solid adsorbent material and wherein the straight-chain hydrocarbons are desorbed and returned to the isomerization reaction without substantial reduction in pressure. The process of this invention is of particular use where isomerization is carried out at higher than atmospheric pressures in that in the present process the separated straight-chain hydrocarbons are returned to the isomerization reaction without substantial reduction in pressure. In accordance with this invention an isomerate from a vapor phase isomerization process, in which the isomerization reaction is conducted at higher than atmospheric pressures and an isomerate is produced, is charged in the vapor phase through a bed of solid adsorbent material whereby straight-chain hydrocarbons are adsorbed. The unadsorbed hydrocarbons are removed from the adsorbent material. The bed of adsorbent material is then desorbed by displacement with normal butanes or other different boiling normal hydrocarbons which are charged through the bed and displace the straight-chain hydrocarbons, e.g., normal pentane and normal hexane, adsorbed thereon. The butane, normal pentane and normal hexane from the desorption are charged to the feed stream for charging to the isomerization reaction of the isomerization process. The unadsorbed hydrocarbons from the adsorption step are charged to a separation zone wherein any butanes or lower-boiling components are removed therefrom. The butanes and lower-boiling products are used as the butane desorption fluid for desorbing the adsorbent material. After removal of the butanes and other components from the unadsorbed hydrocarbons, the remaining hydrocarbons are taken as a high-octane denormalized product enriched in isopentane and isohexane with respect to the isomerate. The isomerization reaction and adsorption and desorption steps are carried out in the vapor phase. The adsorption, separation of butanes and desorption, and recycle of straight-chain hydrocarbons are accomplished without substantial reduction in pressure from the pressure of the isomerization reaction.

In one embodiment of this invention, the isomerization reaction of the isomerization process is conducted in the presence of hydrogen and hydrogen is separated during the separating step. The separated hydrogen is charged to the butane desorption fluid and passed therewith through the adsorbent material during the desorption cycle to provide additional stripping.

It is necessary that the isomerate be substantially free of hydrogen halides when charged to the adsorbent material in that the adsorbent materials useful herein are generally adversely affected and even attacked by hydrogen halides. Thus, where the isomerization process is promoted with hydrogen halide, means should be provided, as a portion of the isomerization process, for removal of hydrogen halides; a bed of alumina or other material which will react with hydrogen halides may be advantageously provided in the effluent stream from the isomerization reaction.

In another embodiment of this invention, a portion of the separated butanes is removed and replaced with normal butane. This embodiment is advantageous because normal butanes are charged during the process to the isomerization reaction zone during desorption of normal pentane and normal hexane from the adsorbent material. The butanes are isomerized to a small appreciable extent in the isomerization reaction. Because desorption in this process is by displacement with the normal butanes, loss of normal butanes during isomerization, i.e., formation of isobutanes from the normal butanes, decreases the amount of normal butane available for desorption. Isobutanes do not displace the n-pentane and n-hexane from the adsorbent material during desorption but merely act as a less effective purge gas. Thus, it is advantageous to remove a portion of the butanes separated from the unadsorbed hydrocarbons and to replace the removed butanes with normal butane.

Where the isomerization reaction is carried out in the presence of hydrogen, it may be advantageous to add make-up hydrogen from time to time. This may advantageously be accomplished by providing a two-step separation wherein during the first step, hydrogen, methane and any other hydrocarbons lighter than butane which may be found in the system are removed. A portion of this hydrogen and lighter hydrocarbon mixture may be withdrawn from time to time and replaced with make-up hydrogen. Make-up hydrogen may conveniently be obtained from a reforming process. In the second step of separation in this embodiment, the butanes are removed providing butanes for use as a desorption fluid and leaving the unadsorbed hydrocarbons as the high-octane denormalized product enriched in isopentanes and isohexanes with respect to the isomerate.

In another advantageous embodiment of this invention, where a mixture of straight-chain and branched-chain pentanes and hexanes is used as the isomerization feed, the isopentanes may be fractionated from the mixture prior to isomerization and the fractionated isopentanes may then be charged directly to the isomerate. In this way a portion of the feed bypasses isomerization and this bypassing permits use of lesser isomerization capacities while increasing the octane of the high-octane product. The deisopentanizing step or fractionation of isopentanes from the feed need not be exact but may be a rough separation of isopentanes. The isopentanes may be charged with the isomerate through the adsorbent material for separation of any normal pentane that might be contained therein and the blending octane of the high-octane product is not, therefore, adversely affected by the presence of normal pentane in the isopentanes removed from the bed.

The figure illustrates a flow diagram for a preferred embodiment of this invention.

With reference to the figure, debutanized light naphtha feed predominating in saturated straight-chain hydrocarbons and branched-chain hydrocarbons is charged to fractionator 12 and $C_7+$ heavy ends recovered through line 13. An overhead fraction predominating in pentanes and hexanes is recovered through line 14 and charged to deisopentanizer 15. An isopentane fraction is taken overhead from deisopentanizer 15 through line 17, is pressurized to 400 p.s.i. and is charged to line 18. The bottoms fraction is removed from deisopentanizer 15 through line 20 and is pressurized to about 400 p.s.i. with pump 54 and is then charged through heater 21 and line 22 to isomerization. Heater 21 heats the isomerization charge to a temperature of 750° F. Isomerization is conducted at a temperature of 750° F. and a pressure of 400 p.s.i. by contacting the feed charged through line 22 with a catalyst consisting of platinum on silica alumina. Isomerization is conducted in the presence of hydrogen. Isomerization effluent, i.e., isomerate is withdrawn from the isomerization reaction zone through line 24 and is charged to line 18 where it is combined with the isopentane overhead from deisopentanizer 15. The hydrocarbons in line 18 are in the vapor phase and are cooled to a temperature of 500° F. in cooler 25 and are then charged, still in the vapor phase, through line 27 and adsorber 28. Adsorber 28 and adsorber 43 are each packed with a solid adsorbent material consisting of Linde Molecular Sieve Type 5A. In adsorber 28, straight-chain hydrocarbons are adsorbed on the molecular sieve adsorbent material and branched-chain hydrocarbons are removed through line 30. The unadsorbed branched-chain hydrocarbons are passed through line 31, cooled in cooler 32 to condense butanes and high-boiling components and the resulting cooled unadsorbed components are charged to separator 33. The condensed hydrocarbons are removed from separator 33 through line 34 and are charged to debutanizer 38, wherein any butane present is taken as an overhead condensed and recycled through line 41. A high-octane isomerized product enriched in isopentanes and isohexanes is withdrawn from debutanizer 38 through line 40. The butanes taken overhead through line 41 are mixed with normal butane charged through line 61 and hydrogen taken as an overhead from separator 33 through line 35 and are passed through line 37 and charged to line 42. The butane stream is heated to about 500° F. in heater 47. From line 42, the butanes are charged through adsorber 43. The hydrogen in line 35 is compressed before charging to line 37 and the mixture in line 42 is at substantially the same pressure as the isomerization reaction, i.e., about 400 p.s.i. Adsorber 43 was previously in the position of adsorber 28 with regard to flow and adsorber 43 is saturated with normal pentane, normal hexane and some normal butane. The mixture of hydrogen and n-butane in line 42 is charged through adsorber 43 and removes adsorbed n-pentane and n-hexane. The stream containing hydrogen, n-butane, n-pentane and n-hexane removed from adsorber 43 through line 44 is charged to line 45 and recycled to line 20 to join the isomerization feed. The hydrogen is used in the isomerization reaction to suppress coking; because the stripping value of the hydrogen is slight during desorption, the hydrogen can be recharged to the isomerization feed without passing through an adsorber.

After adsorber 28 is saturated with straight-chain hydrocarbons and adsorber 43 is desorbed, the two adsorbers are exchanged in their flow positions so that adsorber 43 is used for adsorption and adsorber 28 is in position for desorption. Valves and manifolding for this purpose are illustrated and may be manipulated as known in the art to place the two adsorbers in their desired positions so that adsorber 43 receives isomerate from line 18 and adsorber 28 receives desorption fluid, i.e., butanes, from line 37. The process in accordance with the flow in the figure is continuous in that adsorbers 28 and 43 are alternated between the two flow positions, in such a manner that while one adsorber is used for adsorption, the other is undergoing desorption. Thus, isomerate is continuously processed through the adsorption system for production of the high-octane product recovered from line 40, e.g., through a pressure release valve.

In the above example of flow, cycle times between adsorption and desorption are five to twenty minutes. The adsorbent beds are switched in position without interrupting flow. On start-up, hydrogen and butane gas are charged to the system through lines 58 and 61 and are charged directly to the isomerization zone through line 37, heater 47, valved line 63, line 45, heater 21 and line 22. Thus, on start-up the adsorbent beds may be bypassed with the purge gas. Valved line 63 is then closed and operation is carried out as described above.

Isomerization reactor 23 may contain alumina or other material reactable with hydrogen halides at the outlet when it is desired to isomerize in the presence of hydrogen halides.

Hydrogen gas and light ends form during the processing, i.e., lighter than butanes, may be removed through valved line 57 as desired and make-up hydrogen may be added through valved line 58. In like manner, butanes may be removed through valved line 60 and make-up n-butane may be added to the system through valved line 61. It is preferred to maintain at least about 70% n-butane based on total butanes in the desorption fluid stream in line 37 and, because butanes will be isomerized to some extent during the processing, it is desirable to add n-butane from time to time and also to remove butanes containing isobutane to maintain the n-butane level.

Heat exchange between various lines in the process flow may be provided as desired. For example, cooler 25 and heater 47 may comprise one heat exchanger wherein lines 18 and 37 are in heat exchange with each other. Also, as another example, cooler 32 may consist of a heat exchanger wherein line 31 is brought into heat exchange with line 11. Other heat exchanges within the system may be evident to those having ordinary skill in the art.

Pumps or compressors have been provided in lines 20, 17, 41 and 35 to create and/or maintain the desired pressure within the system. All pumps, gauges and valves which may be desired have not been illustrated but their inclusion may be done by those skilled in the art in the exercise of ordinary engineering skills. The illustrated valves are not indicated by reference numbers; the omission of reference numbers is for the sake of clarity and manipulations of valves are evident to those having ordinary skill in the art with reference to the above disclosures and descriptions.

It follows from the flow of the illustrated embodiment that the only pressure drop throughout the system provided is that pressure drop necessary to maintain flow through the system in the desired direction.

The isomerization feeds which may be used in accordance herewith are those feeds normally used for isomerization processes where the feed contains at least one member of the group consisting of n-pentane and n-hexane. Advantageously, such feeds usually contain both n-pentane and n-hexane. Other hydrocarbons are also usually present but it is preferred that the feed consist predominantly of n-pentane and n-hexane. A particularly preferred isomerization feed is that obtained from the fractionation of a light virgin naphtha to provide a $C_6$ minus cut as the isomerization feed material. The light virgin naphtha may be a debutanized light virgin naphtha, in which case almost all of the butane charged to the system will be charged to the desorption fluid. Where the feed is not debutanized, the butane in the isomerization effluent is separated downstream from the adsorption and is recycled to the desorption fluid. In the latter instance, some of the n-butane will be adsorbed on the adsorbent material and usually the light naphtha feed will not contain sufficient n-butane so that after adsorption of part of the n-butane there would be sufficient n-butane separated from the adsorption effluent to provide the desired amount in the desorption fluid. Thus, even where a butane containing feed is used, it is advantageous to supplement the desorption fluid stream by addition of extraneous n-butane thereto.

The isomerization reaction is a vapor phase isomerization reaction and is conducted at a pressure above atmospheric pressure. Advantageously the isomerization reaction is carried out at a temperature above about 300° F. and at a pressure in the range of from about 100 to about 1000 p.s.i. It is preferred to carry out the isomerization reaction at a temperature in the range of from about 300° F. to about 900° F. and at a pressure of from about 300 to about 500 p.s.i. It is further preferred that the isomerization be carried out in the presence of a non-halide promoted catalyst such as platinum on silica alumina, platinum on an alumino silicate, palladium on an alumino silicate, and the like. However, where it is deemed desirable to use a process employing a halide promoted catalyst, such a catalyst as solid aluminum chloride promoted with hydrogen chloride may be used; where such hydrogen halide promotion is used, the effluent from the isomerization reaction should be substantially hydrogen-halide free for protection of the adsorbent material. The isomerization may advantageously be carried out in the presence of hydrogen to suppress coking and to provide additional stripping with hydrogen during adsorption if desired although such additional stripping with hydrogen is believed to be minimal. Of course, the temperatures, pressures, promotors and presence or absence of hydrogen may depend to a great extent on the type of catalyst used. Each catalyst system has its own optimum conditions at least with regard to temperatures and pressures.

The adsorbent materials useful in accordance herewith are those solid adsorbent materials which have a high power of selectivity in adsorbing normal paraffins from their mixtures with other hydrocarbons. Crystalline metal alumino-silicates, such as calcium alumino-silicate, strontium alumino-silicate, sodium alumino-silicate, barium alumino-silicate, and potassium alumino-silicate are suitable solid sorbents to be used although they do not necessarily provide quantitatively the same results. Crystalline calcium alumino-silicate, which has been heated to remove the water of hydration is preferred. These crystalline calcium alumino-silicates which have been heated to remove the water of hydration have por diameters of about 5.1 A. units; this diameter is slightly larger than the calculated critical diameter of normal paraffin molecules, but somewhat smaller than the critical diameter of isoparaffins, cycloparaffins and aromatics. Thus, it is possible to sorb normal paraffins from the mixture of branched-chain hexanes, cycloparaffins and even aromatic hydrocarbons.

Adsorption and desorption may advantageously be carried out at temperatures ranging from about 100° F. to higher temperatures even up to 900° F. in some cases. The normal adsorption and desorption temperatures for use with solid adsorbents may be used in accordance herewith. However, it is particularly preferred to carry out both the adsorption and desorption steps at a temperature in the range of from about 300° F. to about 600° F. Lower temperatures are not very effective in the adsorption and desorption cycle and may not provide adsorption and desorption in the vapor phase such as is carried out in accordance with this invention. Temperatures higher than 600° F. may cause molecular decomposition and coking on the adsorbent material. The adsorption and desorption steps are carried out at substantially the same pressure as the isomerization reaction and thus, the entire process of this invention is carried out without substantial drop in pressure from the isomerization pressure.

During the desorption by displacement with other butane, at least about 2–3 moles of n-butane are used in the desorption fluid to displace each mole of adsorbed n-pentane and n-hexane. About one mole of n-butane remains on the adsorbent material the rest passes through the adsorbent material with any hydrocarbon light ends remaining in the system. Where hydrogen is used in the desorption fluid, the hydrogen also passes through the adsorbent bed. The bulk of the n-butane which remains on the bed is displaced back into the isomerized product by n-pentane and/or n-hexane when the desorbed bed is returned to adsorption service.

The n-butane contained in the feed or recycled to the feed to the isomerization reactor acts mainly as a diluent. However, as indicated above, a small part is isomerized to isobutane. Also light ends are formed during the isomerization process. In order to prevent undue buildup of isobutane and light ends, portions of butane and lighter components are removed from time to time with addition of n-butane, and where desired, hydrogen. The recovered isobutane may subsequently be used as a feed component for an alkylation.

It is evident from the above that we have provided an integrated combination wherein isomerization effluent is charged directly to adsorption and is processed without substantial drop in pressure. This invention has marked advantages over separate processes for adsorption and for isomerization. In the present process, no vaporization and condensation is required between process steps and hence energy requirements may be kept at much lower level; also fewer piece of equipment are necessary. In essence, a vapor phase isomerization unit is herein converted to the combined process by addition of two adsorbent beds and a butane separation section. Where hydrogen is used during isomerization, slightly more hydrogen is circulated to maintain the desired hydrogen pressure and the equipment is slightly larger to handle the butane and hydrogen recycle. The same basic operation as carried out in two separate processes, i.e., an adsorption process and an isomerization process, would require double such equipment as furnaces, exchangers, pumps, etc. Also, an additional advantage of the present process is that in contrast to other vapor phase adsorption processes there is but little energy penalty in the present process as compared to energy utilization in liquid phase adsorption processes.

We claim:
1. In a vapor phase isomerization process wherein the isomerization reaction is conducted at higher than atmos- pheric pressures in a reaction zone and wherein an isomerate substantially free of hydrogen halide is produced by isomerization of a hydrocarbon feed containing a normal hydrocarbon selected from the group consisting of n-pentane and n-hexane in the presence of n-butane, the combination with said process of the steps of charging said isomerate in the vapor phase through a bed of adsorbent material capable of selectively adsorbing said normal hydrocarbon whereby said normal hydrocarbon is adsorbed by said adsorbent material, recovering unadsorbed hydrocarbons from said bed, separating butane from said unadsorbed hydrocarbons, recovering as a high-octane substantially denormalized product enriched in branched-chain isomers of said normal hydrocarbon with respect to said isomerate said unadsorbed hydrocarbons from which butane has been separated, charging separated butane through said bed of adsorbent material whereby said normal hydrocarbons are desorbed by said separated butane, recovering butane and desorbed said normal hydrocarbons from said bed, and charging said recovered butane and normal hydrocarbon to the reaction zone of said isomerization process without substantial reduction in pressure below the pressure of said isomerization reaction.

2. The process of claim 1 wherein said isomerization reaction is conducted in the presence of hydrogen partial pressure and wherein a lighter than butane fraction containing hydrogen is separated from the unadsorbed hydrocarbons recovered from the bed of adsorbent material.

3. The process of claim 1 wherein said hydrocarbon feed contains n-pentane and n-hexane.

4. The process of claim 3 wherein said feed is obtained as an overhead fraction from the fractionation of a virgin naphtha.

5. The process of claim 4 wherein the overhead fraction from the fractionation consists predominantly of pentanes and hexanes, the overhead fraction is deisopentanized prior to charging to isomerization and the isopentanes removed by deisopentanization are charged to the isomerate.

6. The process of claim 1 wherein said adsorbent material is dehydrated crystalline calcium alumino-silicate.

7. The process of claim 1 wherein said isomerization process is conducted in the absence of free hydrogen halide.

8. The process of claim 1 wherein said isomerization process includes the additional step of removing hydrogen halide by contacting isomerate with alumina.

9. The process of claim 1 wherein the isomerization reaction is conducted at a pressure of from about 300 to about 500 p.s.i.

10. The process of claim 1 wherein the isomerate charged through the bed of adsorbent material is at a temperature in the range of from about 300 to about 600° F.

11. The process of claim 1 wherein during desorption of the normal hydrocarbon from the adsorbent material at least about two moles of n-butane are charged through the bed per mole of adsorbed normal hydrocarbon.

12. The process of claim 1 wherein a portion of the separated butanes is withdrawn and is replaced with normal butane.

13. The process of claim 2 wherein a portion of the separated lighter than butane fraction is withdrawn and replaced with hydrogen gas.

14. A process for producing a high-octane blending component from a low-octane hydrocarbon feed predominating in n-hexane and n-pentane, which process comprises fractionating said feed to obtain an overhead fraction predominating in isopentane and a bottoms fraction of depleted isopentane content, charging said bottoms fraction to an isomerization zone at a temperature in the range of from about 300° F. to about 900° F. and a pressure of from about 300 p.s.i. to about 600 p.s.i. in the presence of hydrogen and isomerization catalyst, isomerizing said bottoms fraction to form an isomerate rich in isopentane and isohexane relative to said bottoms fraction, combining said isomerate and said overhead fraction and charging the resulting combined hydrocarbons through a first adsorption zone containing a crystalline metal alumino-silicate adsorbent material, recovering unadsorbed hydrocarbons from said first adsorption zone, separating hydrogen and butanes from said unadsorbed hydrocarbons, recovering said unadsorbed hydrocarbons as a high-octane substantially denormalized hydrocarbon fraction predominating in isopentanes and isohexanes, discontinuing flow of said combined hydrocarbons through said first adsorption zone, charging said recovered butane through said first adsorption zone whereby adsorbed n-pentane and adsorbed n-hexane are described from said first zone, simultaneously charging said combined hydrocarbons through a second adsorption zone recovering n-butane, n-pentane and n-hexane from said first adsorption zone and charging the recovered n-butane, n-pentane and n-hexane to the bottoms fraction of said fraction for recycle to said isomerization zone, recovering unadsorbed hydrocarbons from said second adsorption zone, processing said unadsorbed hydrocarbons from said second adsorption zone in the same manner as the unadsorved hydrocarbons from the first adsorption zone, whereby additional product is produced and hydrogen and butanes are recovered for use in desorbing n-pentane and n-hexane from said adsorption zones, and alternatingly charging said combined hydrocarbons and n-butane through each of said adsorption zones whereby while each adsorption zone is being charged with said combined hydrocarbons for adsorption the other adsorption zone is simultaneously being charged with n-butane for desorption with continuous isomerization of said bottoms fraction and production of said high-octane product.

References Cited in the file of this patent

UNITED STATES PATENTS

| | | |
|---|---|---|
| 2,905,619 | Sutherland | Sept. 22, 1959 |
| 2,909,583 | Bleich | Oct. 20, 1959 |
| 2,956,089 | Mattox et al. | Oct. 11, 1960 |
| 2,966,528 | Haensel | Dec. 27, 1960 |

OTHER REFERENCES

Kellogg. Oil and Gas Journal, vol. 55, No. 12, page 155, March 25, 1957.

UNITED STATES PATENT OFFICE
CERTIFICATE OF CORRECTION

Patent No. 3,150,205                          September 22, 1964

Herbert G. Krane et al.

It is hereby certified that error appears in the above numbered patent requiring correction and that the said Letters Patent should read as corrected below.

Column 5, line 75, for "por" read -- pore --; column 8, line 31, for "described" read -- desorbed --; line 36, for "fraction", second occurrence, read -- fractionation --; line 40, for "unadsorved" read -- unadsorbed --.

Signed and sealed this 12th day of January 1965.

(SEAL)
Attest:

ERNEST W. SWIDER                          EDWARD J. BRENNER
Attesting Officer                           Commissioner of Patents